(12) United States Patent
Ochiai et al.

(10) Patent No.: US 9,918,038 B2
(45) Date of Patent: Mar. 13, 2018

(54) SYSTEM AND METHOD FOR MULTIMEDIA CAPTURE

(71) Applicant: Toyota Motor Engineering & Manufacturing North America, Inc., Erlanger, KY (US)

(72) Inventors: Yuichi Ochiai, Cupertino, CA (US); Katsumi Nagata, Foster City, CA (US); Akira Sasaki, San Jose, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 111 days.

(21) Appl. No.: 15/056,613

(22) Filed: Feb. 29, 2016

(65) Prior Publication Data

US 2017/0251163 A1   Aug. 31, 2017

(51) Int. Cl.
*H04N 5/932* (2006.01)
*H04N 5/77* (2006.01)
(Continued)

(52) U.S. Cl.
CPC ............ *H04N 5/77* (2013.01); *B60R 11/04* (2013.01); *G01C 21/3602* (2013.01); *G06K 9/00718* (2013.01); *G06K 9/00791* (2013.01); *G06K 9/00832* (2013.01); *H04N 5/04* (2013.01); *H04N 5/23219* (2013.01); *H04N 5/247* (2013.01); *H04N 7/188* (2013.01);
(Continued)

(58) Field of Classification Search
CPC ....... B60R 11/04; G01C 21/3602; G06F 3/16; G06K 9/00718; G06K 9/00791; G06K 9/00832; H04N 5/04; H04N 5/23219; H04N 5/247; H04N 5/9201; H04N 5/9202; H04N 7/188

USPC .......................... 386/201, 223; 348/148–149
See application file for complete search history.

(56) References Cited

U.S. PATENT DOCUMENTS 5,570,127 A   10/1996   Schmidt
6,211,907 B1   4/2001   Seaman et al.
(Continued)

FOREIGN PATENT DOCUMENTS

WO    WO 02/093521 A1    11/2002

OTHER PUBLICATIONS

Zac Hall; "*iPhone 6s Plus: Living with Live Photos*"; 9to5mac.com; Oct. 2; 13 pages.

*Primary Examiner* — Helen Shibru
(74) *Attorney, Agent, or Firm* — Snell & Wilmer L.L.P.

(57) ABSTRACT

Methods, systems, and apparatus for multimedia capture. The system includes one or more storage devices connected through a network to a vehicle. The vehicle includes a memory for buffering video. The vehicle includes multiple cameras coupled to one or more video processors. The one or more video processors are configured to capture a first video of an interior view of the vehicle for a period of time, capture a second video of an exterior view of surroundings of the vehicle for the period of time, and synchronize the first video and the second video. The vehicle includes one or more microphones coupled to one or more audio processors for capturing audio and an electronic control unit. The electronic control unit includes a multimedia processor. The electronic control unit is configured to buffer the synchronized video, detect a triggering event, and store the synchronized video.

20 Claims, 6 Drawing Sheets

(51) Int. Cl.
  *H04N 5/247*  (2006.01)
  *H04N 5/04*   (2006.01)
  *G06K 9/00*   (2006.01)
  *H04N 5/232*  (2006.01)
  *H04N 7/18*   (2006.01)
  *B60R 11/04*  (2006.01)
  *G01C 21/36*  (2006.01)
  *H04N 9/82*   (2006.01)

(52) U.S. Cl.
  CPC ......... *H04N 9/8211* (2013.01); *H04N 9/8227* (2013.01); *G06K 9/00302* (2013.01); *G06K 2009/00738* (2013.01)

(56) References Cited

U.S. PATENT DOCUMENTS

| | | | |
|---|---|---|---|
| 6,738,088 B1 | 5/2004 | Uskolovsky et al. | |
| 6,738,089 B1 | 5/2004 | Site | |
| 6,795,111 B1 | 9/2004 | Mazzilli | |
| 7,386,376 B2 * | 6/2008 | Basir | G07C 5/085 701/32.2 |
| 7,983,817 B2 | 7/2011 | Breed | |
| 8,040,376 B2 | 10/2011 | Yamada et al. | |
| 8,520,070 B1 | 8/2013 | Englander et al. | |
| 8,803,676 B2 * | 8/2014 | Sitarski | G06T 13/80 340/438 |
| 8,930,040 B2 * | 1/2015 | Gompert | G07C 5/008 701/1 |
| 9,702,183 B1 * | 7/2017 | Ochiai | E06B 9/24 |
| 9,728,228 B2 * | 8/2017 | Palmer | G11B 27/105 |
| 9,738,156 B2 * | 8/2017 | Plante | B60K 35/00 |
| 2002/0124260 A1 | 9/2002 | Rivera | |
| 2005/0275510 A1 | 12/2005 | Li | |
| 2008/0143834 A1 * | 6/2008 | Comeau | H04N 7/18 348/148 |
| 2008/0309762 A1 | 12/2008 | Howard et al. | |
| 2009/0262202 A1 * | 10/2009 | Leonard | H04N 5/23203 348/207.1 |
| 2012/0262673 A1 | 10/2012 | Larsson | |
| 2013/0073114 A1 * | 3/2013 | Nemat-Nasser | B60W 40/09 701/1 |
| 2013/0278770 A1 * | 10/2013 | McCammon | H04N 7/18 348/148 |
| 2014/0028852 A1 * | 1/2014 | Rathi | H04N 7/181 348/159 |
| 2014/0307092 A1 | 10/2014 | Kwon | |
| 2015/0178315 A1 * | 6/2015 | Topakas | G06F 3/017 715/863 |
| 2016/0103212 A1 * | 4/2016 | Nath | G01S 13/931 342/28 |
| 2016/0140403 A1 * | 5/2016 | Nagata | B60R 1/06 382/104 |
| 2016/0189542 A1 * | 6/2016 | Myer | G08G 1/096783 340/905 |
| 2016/0293008 A1 * | 10/2016 | Nagata | G08G 1/005 |

* cited by examiner

SYSTEM AND METHOD FOR MULTIMEDIA CAPTURE

BACKGROUND

Field

This specification relates to the capturing, recording and sharing of a road trip album.

Description of the Related Art

Video photography and recording equipment are used for capturing and recording images. In vehicles, video equipment has been used to record video images of individuals inside the vehicle and images outside the vehicle. The video may undergo an editing process and then displayed. However, the video images are uncorrelated and not synchronized, making the process of capturing and recording the whole picture causing a spontaneous event difficult. Moreover, the capture of the video images is manually initiated which results in some spontaneous events being missed.

Accordingly, there is a need of a system and method for capturing, recording, and sharing all angles and perspectives of a spontaneous event during a road trip.

SUMMARY

In general, one aspect of the subject matter described in this specification is embodied in a system for a multimedia capture system for a vehicle that includes one or more storage devices connected through a network to a vehicle. The vehicle includes a memory for buffering video and coupled to one or more video processors. The vehicle includes multiple cameras. The multiple cameras include a first camera and a second camera and are coupled to one or more video processors. The one or more video processors are configured to capture a first video of an interior view of the vehicle for a period of time and capture a second video of an exterior view of surroundings of the vehicle for the period of time. The one or more video processors are configured to synchronize the first video and the second video. The vehicle includes one or more microphones coupled to one or more audio processors for capturing audio within the vehicle and an electronic control unit that may include a multimedia processor. The multimedia processor may include the one or more video processors and the one or more audio processors. The electronic control unit is configured to buffer the synchronized video, detect a triggering event, and store the synchronized video.

These and other embodiments may optionally include one or more of the following features. The one or more audio processors may be configured to capture audio that may include one or more audio expressions from the interior of the vehicle. The one or more audio processors may measure a frequency level of the one or more audio expressions. The electronic control unit may determine that the triggering event occurred if the frequency level of the one or more audio expressions is within a particular range. The particular range may be user configurable or pre-determined.

The multimedia processor may be configured to synchronize the audio with the synchronized video. The electronic control unit may be configured to store the synchronized video between a start time and a finish time, the start time being at or before the triggering event and the finish time being a threshold amount of time after the triggering event. The start time, the finish time and/or the threshold amount of time after the triggering event may be a user configurable setting. The triggering event may be a selection of a user interface element on a user interface.

The vehicle may include a navigation unit coupled to the electronic control unit for obtaining vehicle information including a current date and time and a current location of the vehicle. The electronic control unit may be configured to obtain the vehicle information and identify one or more landmarks based on the vehicle information. One or more external databases may be connected to the vehicle through the network. The one or more external databases may include landmark information. The electronic control unit may be configured to obtain the landmark information and identify one or more landmarks based on the landmark information. The electronic control unit may tag the one or more landmarks in the synchronized video. The electronic control unit may access the one or more storage devices and transmit the synchronized video to the one or more storage devices connected to the vehicle to store the synchronized video.

In another aspect, the subject matter may be embodied in a method for a road trip album for a vehicle. The method may include capturing, in one or more video processors and using a first camera, a first video of an interior view of the vehicle for a period of time. The method may include capturing, in the one or more video processors and using a second camera, a second video of an exterior view of surrounding of the vehicle for the period of time. The method may include synchronizing, using the one or more video processors, the first video and the second video, and buffering, in a memory, the synchronized video. The method may include detecting a triggering event, and storing the synchronized video.

In another aspect, the subject matter may be embodied in a system for a multimedia capture system for an autonomous vehicle that includes one or more storage devices connected through a network to the autonomous vehicle. The autonomous vehicle includes a memory for buffering video and coupled to one or more video processors. The autonomous vehicle includes multiple cameras. The multiple cameras include a first camera and a second camera and are coupled to one or more video processors. The one or more video processors are configured to capture a first video of an interior view of the autonomous vehicle for a period of time and capture a second video of an exterior view of surroundings of the autonomous vehicle for the period of time. The one or more video processors are configured to synchronize the first video and the second video. The autonomous vehicle includes one or more microphones coupled to one or more audio processors for capturing audio within the autonomous vehicle and an electronic control unit that may include a multimedia processor. The multimedia processor may include the one or more video processors and the one or more audio processors. The electronic control unit is configured to buffer the synchronized video, detect a triggering event, and store the synchronized video.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for predicting, preparing, and implementation of a multimedia capture mode. Particular embodiments of the subject matter described in this specification may be implemented to realize one or more of the following advantages. A multimedia capture system automatically tags and captures unexpected moments of fun or excitement while travelling in a vehicle. For example, a passenger in a vehicle may be travelling on a road trip and may shout out "look at that waterfall!" The multimedia capture system would be able to tag that event and video the passenger who shouted, the other passengers' reaction or facial expression and the waterfall.

The multimedia capture system may generate a road trip album from the captured road trip events. By automatically detecting unexpected moments, the multimedia capture system captures candid reactions of the passengers and/or the driver. The entire road trip event starting moments before a triggering event until sometime after the trigger event is captured so not a moment is missed. The reaction of the occupants, the road trip event, and the surrounding environment may all be captured, stored, and/or displayed in real-time, e.g., on a personal handheld device or on a vehicle (e.g., a rear seat) entertainment center.

Other benefits and advantages include the capability to capture, synchronize, store, and display a panoramic view of the surrounding environment outside the vehicle alongside the reactions of the occupants. Additional benefits and advantages may include the capability to capture, synchronize, store, and play sounds internal and/or exterior to the vehicle along with the video. For example, as the vehicle passes the Golden Gate Bridge, the multimedia capture system may record the children inside the vehicle in awe of the view, the view of the San Francisco Bay outside one window, the view of downtown San Francisco outside another window, the sound of a passing trolley, and the sound of excitement expressed by the children. By having the capability to record, capture, and synchronize the different views and sounds, an individual has a record of every detail that made the road trip memorable.

Figure 1:
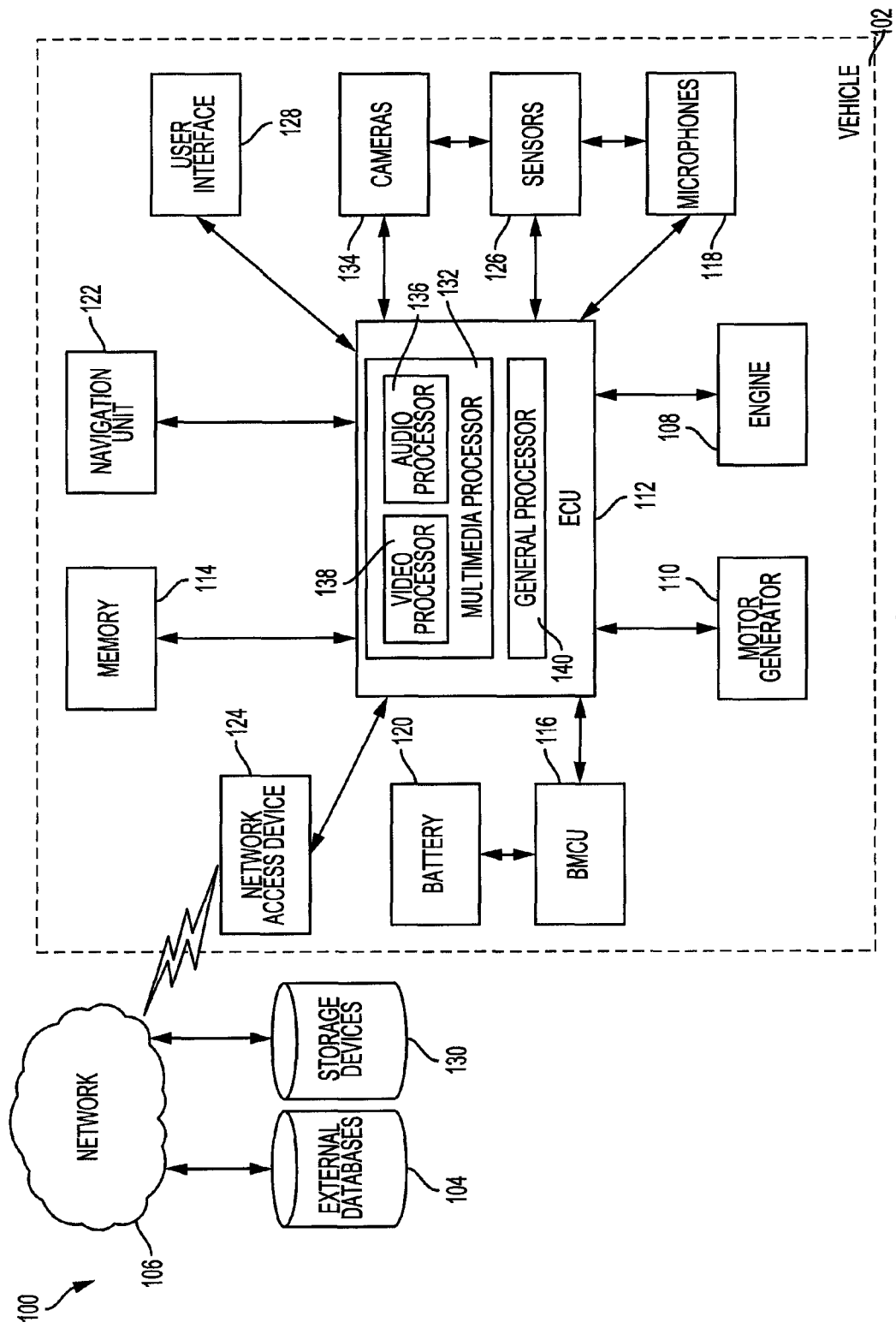
FIG. 1 is a block diagram of an example multimedia capture system for a vehicle according to an aspect of the invention.

FIG. 1 is a block diagram of an example multimedia capture system of a vehicle 102. The multimedia capture system 100 may include one or more computers or electronic control units (ECUs), appropriately programmed, to capture road trip events in a road trip album.

The multimedia capture system 100 includes a vehicle 102 that is coupled to a network 106, one or more external databases 104 and one or more storage devices 130. A vehicle, e.g., vehicle 102, is a conveyance capable of transporting a person or persons or any material or any permanently or temporarily affixed apparatus. A vehicle may be a self-propelled wheeled conveyance, such as a car, sport utility vehicle, truck, bus, van or other motor or battery driven vehicle. For example, the vehicle 102 may be a gasoline or diesel engine powered vehicle, an electric vehicle, a hybrid vehicle, a plug-in hybrid vehicle or any other type of vehicle that includes an engine 108, a battery 120 and/or a motor/generator 110. Other examples of vehicles include bicycles, trains, planes, or boats, and any other form of conveyance that is capable of transportation. A vehicle, e.g., vehicle 102, may be semi-autonomous or autonomous. That is, the vehicle 102 may be self-maneuvering and navigate without human input. An autonomous vehicle may use one or more sensors, e.g., the one or more sensors 126, and a navigation unit, e.g., the navigation unit 122, to drive autonomously.

The vehicle 102 may be coupled to a network 106. The network 106, such as a local area network (LAN), a wide area network (WAN), a cellular network, the Internet, a dedicated short-range communications (DSRC) or combinations thereof, connects the vehicle 102 to the one or more external databases 104. The external databases 104 may include many databases from different service providers. A service provider may provide information to the vehicle 102. Information provided by the service providers may include map information. The information may be stored in the one or more databases, e.g., external databases 104.

A database is any collection of pieces of information that is organized for search and retrieval, such as by a computer, and the database may be organized in tables, schemas, queries, report, or any other data structures. A database may use any number of database management systems. The one or more external databases 104 may include a third-party server or website that stores or provides information. The information may be real-time information, updated periodically, or user-inputted. A server may be a computer in a network that is used to provide services, such as accessing files or sharing peripherals, to other computers in the network. A website may be a collection of one or more resources associated with a domain name.

Map information may include landmark information. Landmark information includes one or more landmark features. Landmark features are places of interest, e.g., tourist places, buildings, bridges, mass transport hubs, historical landmarks, natural terrain features such as mountains, rivers, and lakes, and other places or structures such as gas stations, stadiums, or any other places of interest. Each landmark feature is associated with map coordinates, elevation information, and/or one or more images. Map coordinates include both longitudinal and latitude coordinates for the feature.

The one or more storage devices 130 coupled to the vehicle via the network 106 may include one or more servers that provide network or cloud storage. That is, the data storage in which the digital data is stored is in physical storage that spans one or more servers located in one or more locations. A hosting company, e.g., a cloud service provider, may manage and/or own the physical environment and is responsible for keeping the data available and accessible, and the physical environment protected and running. In some implementations, the one or more storage devices 130 may include a personal device, e.g., a smartphone. The personal device may be a personal device that is connected to the vehicle 102 or a personal device located outside the vehicle 102.

The vehicle 102 may include an engine 108, a motor/generator 110, an electronic control unit (ECU) 112, a memory 114, a battery management and control unit (BMCU) 116, one or more microphones 118, multiple cameras 134, and/or a battery 120. The vehicle 102 may also include a navigation unit 122, a network access device 124, one or more sensors 126, and/or a user interface 128.

The motor/generator 110 may convert electrical energy into mechanical power, such as torque, and may convert mechanical power into electrical energy. The motor/generator 110 may be coupled to the battery 120. The motor/generator 110 may convert the energy from the battery 120 into mechanical power, and may provide energy back to the battery 120, for example, via regenerative braking. In some implementations, the vehicle 102 may include one or more additional power generation devices such as the engine 108 and/or a fuel cell stack (not shown). The engine 108 combusts fuel to provide power instead of and/or in addition to the power supplied by the motor/generator 110.

The battery 120 may be coupled to the motor/generator 110 and may provide electrical energy to and receive electrical energy from the motor/generator 110. The battery 120 may include one or more rechargeable batteries.

The BMCU 116 may be coupled to the battery 120 and control and manage the charging and discharging of the battery 120. The BMCU 116, for example, may measure, using battery sensors (not shown), parameters used to determine the state of charge (SOC) of the battery 120.

The ECU 112 may be electrically coupled to some or all of the components of the vehicle 102. The ECU 112 may include one or more processors or controllers specifically designed for automotive systems and vehicles, and the functions of the ECU 112 may be implemented in a single ECU or in multiple ECUs. The ECU 112 may receive data from one or more components and control the operations of the one or more components based on the received or determined data. For example, the ECU 112 may receive data from a navigation unit 122, one or more sensors 126, and a network access device 124 and integrate the data received from each of the devices to output a display on a user interface 128. The ECU 112 may control the operations of the BMCU 116 to charge or discharge the battery 120.

The memory 114 may be coupled to the ECU 112. The memory 114 may store instructions to execute on the ECU 112 and may include one or more of a Random Access Memory (RAM) or other volatile or non-volatile memory. The memory 114 may be a non-transitory memory or a data storage device, such as a hard disk drive, a solid-state disk drive, a hybrid disk drive, or other appropriate data storage, and may further store machine-readable instructions, which may be loaded and executed by the ECU 112.

The ECU 112 may be coupled to one or more sensors 126. In some implementations, the one or more sensors 126 may couple to one or more of the multiple cameras 134 and/or one or more of the microphones 118. In some implementations, the one or more sensors 126 may connect to one or more of the multiple cameras 134 and/or the one or more microphones 118 through the ECU 112. The one or more sensors 126 may detect various internal or external environmental parameters.

Internal environmental parameters may include facial features or facial positions. The ECU 112 may use one or more internal sensors to detect facial features or positions to determine whether an occupant inside the vehicle 102 is looking in a particular direction and/or facing a direction of one of the multiple cameras 134. Audio information, video information, or a combination of both may be used to determine a triggering event and/or interpret reactions of vehicle occupants. An occupant is any person inside the vehicle, including the driver.

External environmental parameters may include the position of other vehicles or non-ambient noises. One or more external sensors may include units and/or devices of the vehicle 102, such as a proximity sensor, that detect events in the environment, e.g., a near collision with another vehicle, that may cause the triggering event.

A triggering event is an occurrence of, a reaction by or a noise or word(s) by an occupant that results from a memorable moment. A road trip event is the particular interval of time before, after, and including the triggering event that captures the memorable moment, the reactions that result from the memorable moment, and the inside and/or the surroundings of the vehicle 102.

The ECU 112 may include one or more data processing apparatuses including a multimedia processor 132 and a general processor 140. A multimedia processor 132 manages and controls multimedia devices of the vehicle 102, such as the one or more microphones 118 and the multiple cameras 134, and manages the media content obtained from the multimedia devices using one or more video processors 138 and one or more audio processors 136. Media content refers to audio data, video data or a combination of both. The multimedia processor 132, for example, correlates and synchronizes processed video streams and audio streams so that media content from different camera angles and different microphones are all correlated and synchronized to be stored in a storage device, e.g., storage devices 130, and/or displayed.

The multimedia processor 132 may include one or more video processors 138. The one or more video processors 138 synchronize multiple video streams from multiple cameras 134. The multiple cameras 134 are both internal and exterior to the vehicle 102.

The multimedia processor 132 may include one or more audio processors 136. The one or more audio processors 136 may synchronize one or more audio streams from one or more microphones 118. The one or more microphones 118 may be in the interior and/or the exterior of the vehicle 102. Synchronization and correlation of the multimedia streams are further described with reference to FIG. 2.

In some implementations, the multimedia processor 132 is not included in the ECU 112. Instead, the multimedia processor 132 may be coupled to the ECU 112. In some implementations, the one or more video processors 138 or the one or more audio processors 136 may be coupled to, but not included in, the multimedia processor 132. In some implementations, the multimedia processor 132, the one or more video processors 138 or the one or more audio processors 136 are external to the vehicle 102 and are coupled to the ECU 112 through the network 106.

Multiple cameras 134 are coupled to the ECU 112 and capture the video streams. One or more microphones 118 are coupled to the ECU 112 and capture audio. The cameras and microphones may be in the interior and on the exterior of the vehicle 102.

A navigation unit 122 may be coupled to the ECU 112 and may include a Global Positioning System (GPS) unit (not shown) for detecting location data and date/time information. The navigation unit 122 may provide navigation instructions based on the detected location data and may include a memory (not shown) for storing route data. The navigation unit 122 may receive data from other sensors capable of detecting data corresponding to location information. For example, the other sensors may include a gyroscope or an accelerometer.

The navigation unit 122 may be integral to the vehicle 102 or a separate unit coupled to the vehicle 102, such as a personal device with navigation capability. When the navigation unit 122 is separate from the vehicle 102, the navigation unit 122 may communicate with the vehicle 102 via the network access device 124. In some implementation, the vehicle 102 may include a GPS unit instead of the navigation unit 122. In that regard, the ECU 112 may perform the functions of the navigation unit 122 based on data received from the GPS unit. Navigation functions may be performed by the navigation unit 122 or the ECU 112. Navigation functions may include, for example, providing navigation instructions, providing a current route, providing a current location of the vehicle 102, and providing current date/time information.

The navigation unit 122 may include a user interface separate from the user interface 128 and/or may communicate via the user interface 128. The user interface 128 may be coupled to the ECU 112 and may be a personal device, e.g., a mobile phone, a tablet, a personal computer, that is connected to the ECU 112 through the network access device 124 across a network 106. The user interface 128 may include any device capable of receiving user input, such as a button, a dial, a microphone, a touchpad or a touch screen, and/or any device capable of output, e.g., a display, a speaker, or a refreshable braille display. The user interface 128 allows a driver or a passenger of the vehicle 102 to communicate with the ECU 112. For example, the driver may be able to provide data to the ECU 112 and/or receive feedback from the ECU 112 via the user interface 128.

The network access device 124 may include a communication port or channel, such as one or more of a Wi-Fi unit, a Bluetooth® unit, a Radio Frequency Identification (RFID) tag or reader, a DSRC unit or a cellular network unit for accessing a cellular network (such as 3G or 4G). The network access device 124 may transmit data to and receive data from devices and systems not directly connected to the vehicle 102. For example, the ECU 112 may communicate with the external databases 104. Furthermore, the network access device 124 may access the network 106, to which the external databases 104 are also connected.

Figure 2:
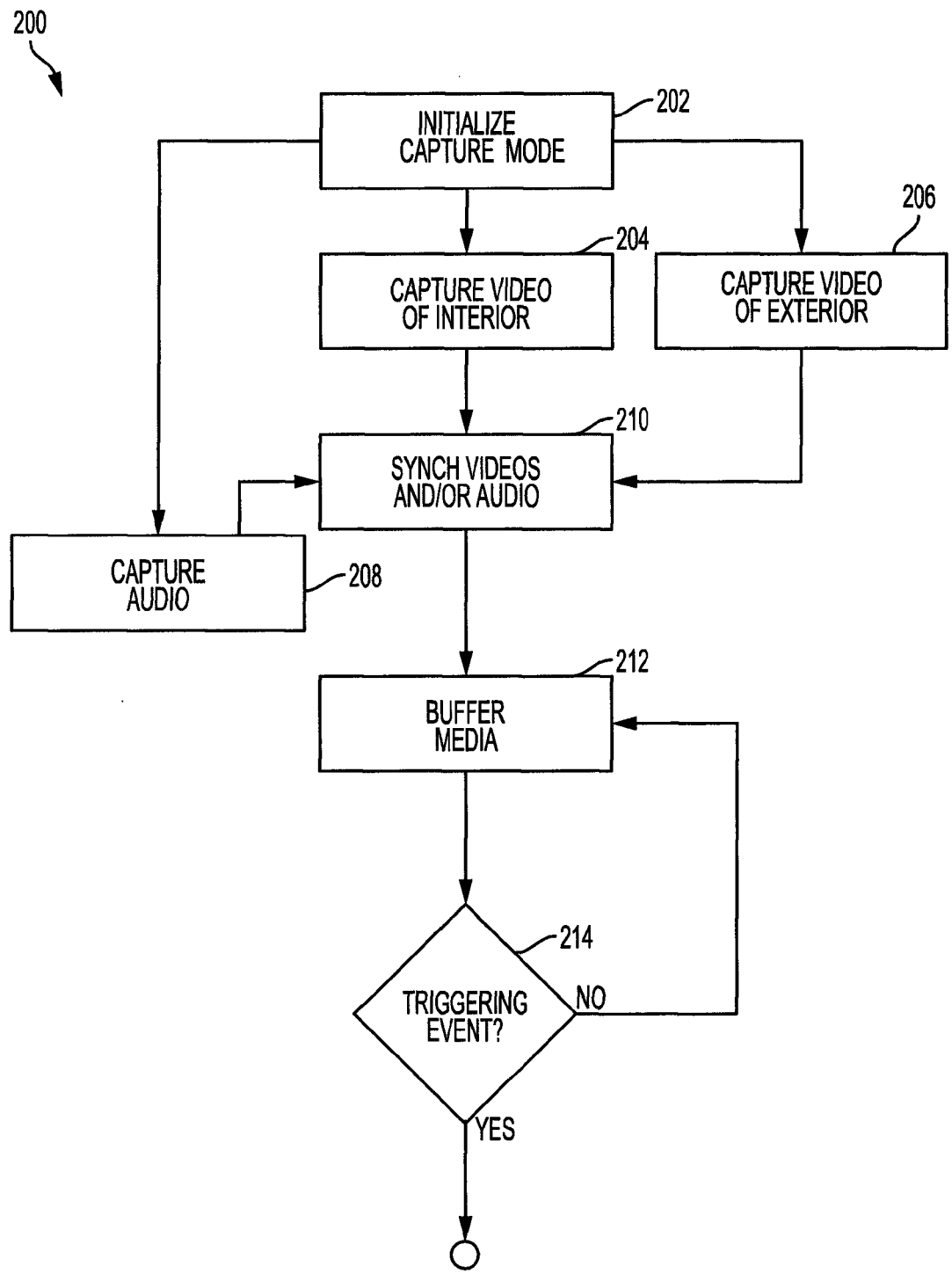
FIG. 2 is a flow diagram of an example process for capturing a road trip event according to an aspect of the invention.
Figure 2:
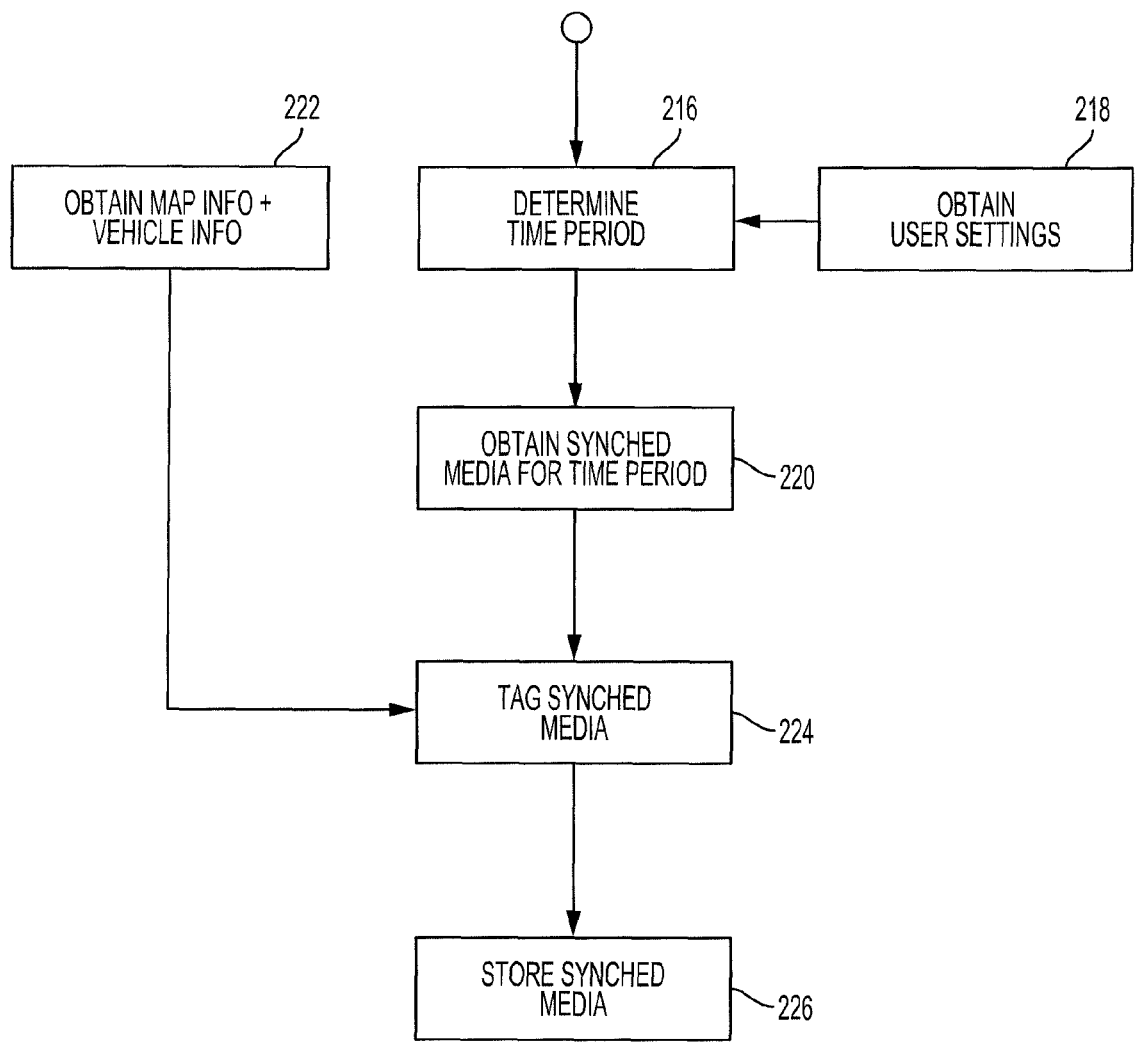

FIG. 2 is a flow diagram of an example process 200 for capturing a road trip event. One or more computers or one or more data processing apparatuses, for example, the ECU 112 of the multimedia capture system 100 of FIG. 1, appropriately programmed, may implement the process 200.

The system may initialize a multimedia capture mode to capture a road trip event (202). The system may initialize a multimedia capture mode based on user input or an indication that the vehicle 102 has been powered on. The system may receive the user input from the user interface 128, or the indication from the one or more sensors 126. For an example, the system may receive an indication from an ignition sensor that the vehicle 102 has been powered on.

User input may include a user selection of a user interface element from a user interface 128. The user selection of a user interface element may be a selection of a touch pad, a touch screen, a switch or a button, e.g., a button on the steering wheel, a button on the seat, or a button on a display. In some implementations, user input may include voice activation.

The system may determine that the vehicle is powered on based on detecting that the ignition switch was activated using one or more sensors 126 or detecting that the navigation unit 122 was activated.

After the initialization of the multimedia capture mode, the system may obtain one or more user configuration settings. The one or more user configuration settings may include one or more buffer settings that control the length of video and/or audio recorded before and/or after a road trip event. Buffer settings may include a setting for a length of video and/or audio to store before a triggering event and/or a length of video and/or audio to store after the triggering event and may initially be set to a default value, e.g., 10 seconds before and 30 seconds after the triggering event. The buffer settings may denote the length in terms of a particular length of time, e.g., 5 minutes, a particular data size, e.g., 5 MB, or a particular percentage, e.g., 5%, of the storage size. In some implementations, the length of time for the buffer before the event is the same as the length of time for the buffer after the event. In other implementations, the buffer before and after the event are different.

The user configuration settings may include a setting to store audio along with the video. Another user configuration setting may include a setting to enable or disable one or more cameras and/or one or more microphones in the vehicle 102 from which video or audio is captured. Other user configuration settings may control the zoom feature of each of the cameras and/or the sensitivity of the microphones. For example, a user configuration may disable an internal camera directed at the driver so that the driver is not distracted while driving. In another example, a user configuration may disable a camera directed toward a particular view, such as a highway noise-barrier outside the passenger side window to prevent the recording of undesirable aspects surrounding the vehicle during a road trip event.

The system captures, using multiple cameras 134 including both interior and exterior cameras, one or more video streams of the interior view of the vehicle 102 (204) and one or more video streams of the exterior view of the environment surrounding the vehicle 102 (206). The capture of the multiple video streams may be based on user configuration settings that enable/disable the multiple cameras 134 and/or adjust the zoom of each of the multiple cameras 134.

One or more interior cameras may focus on one or more of the occupants inside the vehicle 102. For example, a camera may be directed towards or trained on the passenger seat of the vehicle 102 and one or more sensors 126 coupled to the multiple cameras 134 may identify facial features or facial positions. The system may control a positioning of an interior camera or a zoom feature of an interior camera based on the facial features or facial positions identified by the one or more sensors 126 to capture a particular perspective.

One or more exterior cameras may focus on the view outside the vehicle 102. The one or more exterior cameras may have a 360-degree or panoramic view of the surrounding environment. The system may control a positioning or zoom feature of one or more exterior cameras based on one or more video subjects. A video subject is a landmark, an event, or any other place or activity outside the vehicle 102 that is a subject of interest. That is, the subject may trigger an emotional reaction to an occupant. For example, as the vehicle 102 passes the Golden Gate Bridge, an exterior camera may identify a boat capsizing in San Francisco Bay and zoom in on the overturned boat. In response to one camera focusing on the capsized boat, one or more other exterior cameras may simultaneously zoom out to ensure 360-degree coverage of the surrounding environment. In one embodiment, using the map coordinates and elevation of the current location of the vehicle 102 and the location of a landmark, the ECU 112 may automatically activate one or more of the external cameras 134 when the exterior surroundings are of the landmark (e.g., a famous landmark) in order to avoid missing taking a video of the landmark. This allows the external cameras 134 to automatically be activated to take a video of the landmark if the passengers forget, are asleep or not paying attention.

In some implementations, the system may coordinate the positioning and adjustments of the interior and exterior cameras to target a particular subject and/or cover the entire interior or exterior views.

The system may capture one or more audio streams from the one or more microphones 118 (208). The system may obtain the one or more audio streams from one or more interior microphones and/or one or more exterior microphones based on a user configurable or default setting. The system may coordinate the positioning and adjustment of the interior and exterior microphones to improve sound quality or sensitivity. For example, the system, using an interior microphone may capture an occupant telling a joke and the ensuing laughter by all occupants of the vehicle 102, and additionally, disable the exterior microphones that are recording the air rushing past the vehicle 102. In another example, the system may use an internal microphone to capture laughter from occupants of a parked car at a drive-in movie theater and use an external microphone to capture the dialogue of a comedy playing at the drive-in movie theater.

The system synchronizes the multiple video streams and/or one or more audio streams (210). Each video stream and/or audio stream may include a timestamp. The time stamp identifies when a video/audio frame was captured. The time stamp may be associated with each frame of each video and/or audio. The system may obtain the time stamp and synchronize the multiple video streams and/or one or more audio streams by matching the corresponding time stamps in the audio/video frames. In some implementations, the system may directly synchronize the video streams and/or audio streams as the system obtains the feed.

The system buffers the media content including the multiple video streams and/or the one or more audio streams (212). The system may buffer the media content in an internal memory 114. The internal memory 114 may allocate a particular amount or size of memory to dedicate to buffer the media content. The particular amount or size may be user configurable or pre-determined. The particular amount or size of the buffer is greater than or equal to a multiple of the amount or size indicated by the buffer settings that set the amount of video and/or audio to store before and after a triggering event. For example, if the buffer settings indicate that 30 seconds of video is stored before a triggering event and 2 minutes of video is stored after the triggering event, then the total size or amount of memory dedicated to the media content may allow for 60 minutes of recorded video and audio so that the 24 triggering events may be stored.

The system determines that there is a triggering event based on one or more reactions of the one or more occupants of the vehicle 102 (214). To determine whether there is a triggering event, the system may analyze facial expressions or vocal expressions using one or more sensors 126 and the one or more interior cameras and/or the one or more microphones. Detection of a triggering event is further described in reference to FIG. 3.

In response to determining that there is a triggering event, the system determines a time period for the road trip event (216). The time period is the amount of time before and after the triggering event that forms the road trip event based on the buffer settings. The buffer settings indicate the amount of video and/or audio to store before and after the triggering event. The system receives user input of user configurable settings through a user interface 128 that define the buffer setting (218). The process of determining that there is a road trip event is further described below in FIG. 3.

The system obtains synched media content for the time period (220). The synched media content includes synchronized audio and/or synchronized video starting at a time $t_0$ and ending at a time $t_1$ that is determined by the buffer settings. In some implementations, the system receives synched media content corresponding to the time period. In other implementations, the system splices media content received to obtain the synched media for the time period.

The system may obtain vehicle information and map information (222). The system may obtain vehicle information from a navigation unit and/or one or more sensors. Vehicle information includes elevation information and map coordinates for the current location of the vehicle. The system may obtain map information from one or more external databases 104 connected to the vehicle 102 through the network 106.

The system may tag the synchronized video with one or more landmarks and location information based on the map information, vehicle information, or a combination of both (224). The system may identify one or more landmarks in the synchronized video using the map coordinates and elevation of the current location of the vehicle 102 included in the vehicle information to determine surrounding landmarks. The system may search one or more external databases for landmarks within a vicinity of the current location of the vehicle 102 and viewable by occupants of the vehicle 102 at the particular elevation of the vehicle 102. For example, if the vehicle is at a particular latitude and longitude that is near a mountain range but the elevation of the vehicle indicates that the vehicle is at sea level, the system may tag the base of a mountain as a landmark in the synchronized media but not a national park that reside halfway up the mountain. In another example, if the vehicle 102 is driving across the Golden Gate Bridge the system may identify the bridge as a landmark but not a ferry port, in the synchronized video, because the ferry port is too far below the bridge to be captured in the synchronized media. Given the current location and elevation of the vehicle 102, the system may access one or more resources or external databases 104 and search for one or more landmarks that correspond to the map coordinates and elevation of the current location of the vehicle 102.

In some implementations, the system captures a video frame from the synchronized media content and extracts objects from the video frame. The system compares the extracted objects to pictures stored in one or more external databases 104. The system may perform picture recognition against images stored in the one or more external databases 104 to identify one or more landmarks that correspond to the objects. The vehicle information may be used to refine the search to identify the one or more landmarks that correspond to the extracted objects.

The system may tag the landmark with identification information, such as a label. The tag may include map coordinates, elevation information, and other information that describes or identifies the landmark. In some implementations, the system may tag the synched media content with information describing the identities of the occupants of the vehicle 102 during the road trip.

The system may store the synched media content in one or more storage devices (226). The one or more storage devices 130 may be a network or cloud storage. In some implementations, the system may store the synched media content to a personal device (e.g., a mobile device or a smart phone) that is connected to the vehicle 102. The system may store additional information including an identity of one or more of the occupants in the vehicle 102 during the road trip event, map coordinates, elevation information, and date/time information of the road trip event with the synched media content. The system may label or provide a title for the synched media and store the label or title information along with the synched media content.

The map coordinates, elevation information, and date/time information may be obtained from user input, the map information, and/or one or more sensors. The identity of the occupants may be obtained from user input or from the one or more sensors using audio or facial recognition.

The system may notify the occupants of the vehicle 102 that media content has been stored and captured. The notification may be based on a user configuration that indicates whether the system should display the notification on the user interface 128 or output the notification, e.g., an audible notification, to indicate that media has been captured and/or stored.

Figure 3:
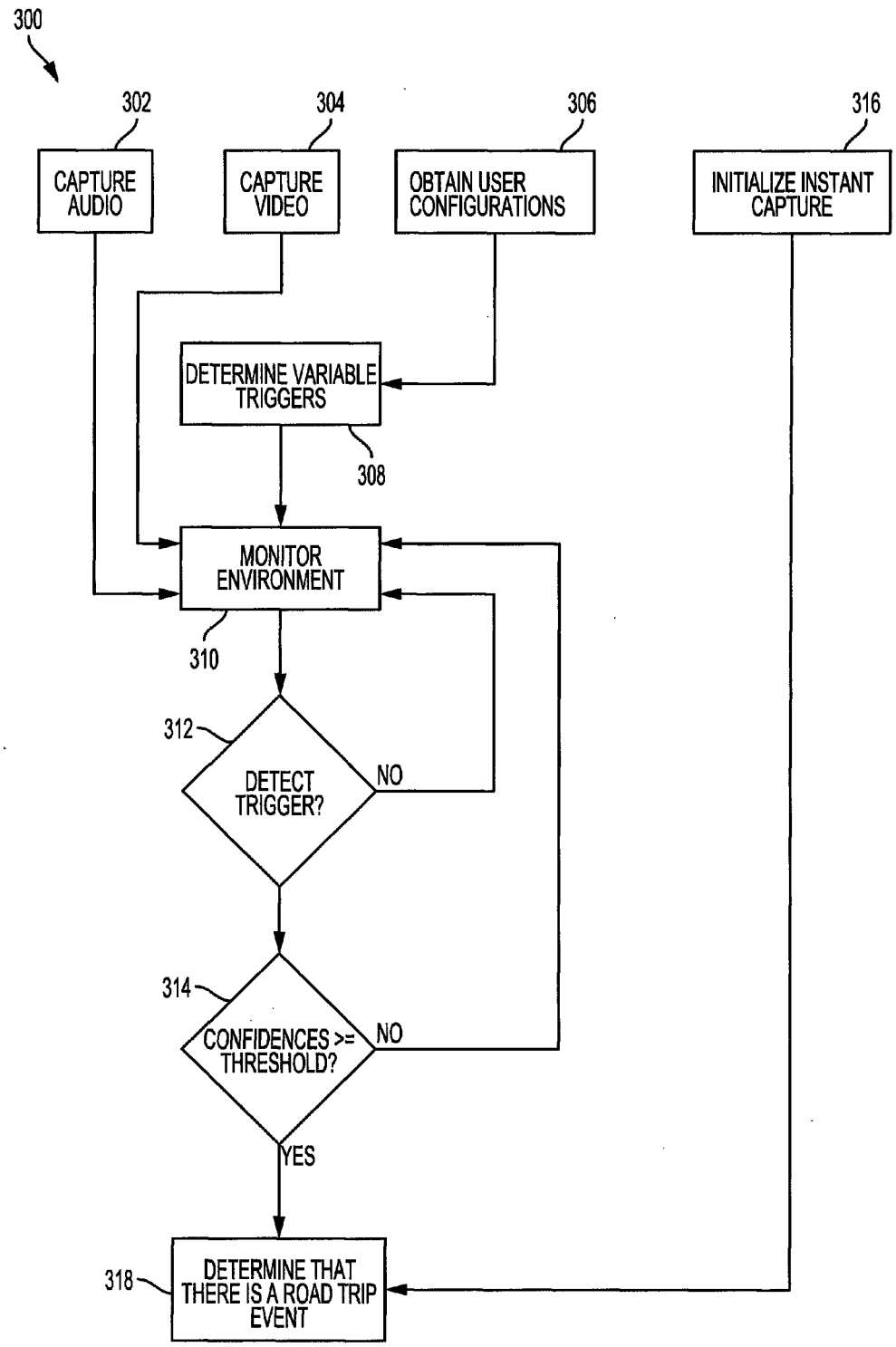
FIG. 3 is a flow diagram of an example process for determining that a road trip event has occurred according to an aspect of the invention.

FIG. 3 is a flow diagram of an example process 300 for determining that a road trip event has occurred. One or more computers or one or more data processors, for example, the ECU 112 of the multimedia capture system 100 of FIG. 1, appropriately programmed, may implement the process 300.

The system captures audio (302) and/or video (304) as described above in FIG. 2. The system may obtain user input of different user configurations that define one or more triggers of a road trip event (306). The different user configurations indicate the various types of reactions or expressions of occupants that trigger a road trip event. For example, an occupant of the vehicle 102 may configure the system to trigger a road trip event when one or more occupants laugh, cry, or otherwise exhibit an emotion different than a stored or previously configured baseline. Another configuration may set the one or more sensors 126 to detect the reaction visually, audibly or a combination of both. Another configuration may adjust the sensitivity of the detection method, e.g., the system may weigh the detection of an audible expression more than the detection of a facial expression. The sensitivity may be based on the type of reaction or expression. For example, the system may weigh an audio program less than a facial expression when analyzing an occupant for sadness, but the system may rate the audio express greater than the facial expression for laughter.

The system determines one or more triggering events that cause a road trip event based on the one or more user configurations (308). For example, the system may only trigger a road trip event when an occupant laughs based on the one or more user configurations.

The system monitors the environment for the one or more triggering events using the one or more sensors 126, the one or more cameras inside the vehicle 102, and the one or more microphones 118 (310). To monitor the environment, the system analyzes the captured video and/or audio streams for the one or more triggering events.

The system detects a triggering event based on the captured audio, video, and/or user configuration settings (312). The system may determine that there is a triggering event based on the captured video. For example, a facial recognition sensor may detect in the captured video an expression of joy in an occupant by comparing a baseline facial expression of the occupant with a current captured expression of the occupant. An occupant may configure and store a baseline facial expression for the occupant in the internal memory 114. The system may recognize the expression of the occupant by comparing the captured video of the expression to a database of stored expressions for occupants of the vehicle. In some implementations, the system may learn that a particular expression is associated with a road trip event by associating a particular expression with a recognized noise that indicates a triggering event. For example, when the system identifies that the occupants are laughing, the system may store the facial expressions of the occupants in the database so that next time the system may identify a triggering event based on the facial expressions indicating that the occupants are laughing.

In some implementations, the system may determine that there is a triggering event based on the captured audio. The system may use one or more sensors 126 to detect from the one or more internal microphones audio of a vocal expression that is of a particular frequency that indicates a human expression, such as laughter, sorrow, happiness, excitement, awe, shock, or any other human emotion. If the sensors detect audio in the particular frequency or within a particular frequency range that indicates a human expression the system may determine that there is a triggering event. Also, the sensors can detect audio greater than a particular frequency or noise level to indicate that a human expression has taken place thus causing the triggering event.

In some implementations, the system may determine that there is a triggering event based on a combination of the captured video and audio using sensors to detect both the one or more vocal expressions and the one or more facial expressions. If the system detects a triggering event, the system may proceed with determining a confidence value for the triggering event. If the system does not detect a triggering event, the system continues to monitor the environment.

The system may track and store in the database a number of times the system identified a particular facial expression and/or audio expression to use in calculating a confidence value. The system also tracks and stores the number of times that the media content was triggered based on the particular facial and/or audio expression and the number of times the media content was later sent to an external storage or personal device.

In some implementations, the system may determine a confidence value for the facial expression and/or vocal expression based on the number of times the system identified the particular expression and the number of times that the media content based on the trigger of the particular expression was sent to external storage or a personal device (314). The system may trigger the triggering event only if the confidence value is greater than or equal to a confidence threshold. Otherwise, the system may continue monitoring the environment for a triggering event.

In some implementations, the system may initialize an instant capture feature (316). The system may receive user input from a user interface 128, e.g., a button, a switch, or a user interface element, that indicates to the system to initialize an instant capture feature. The instant capture feature automatically and immediately begins capturing, synching, tagging, and/or storing of media content, i.e., audio and/or video. The instant capture feature may have a size or a time limit that limits the amount or length of the captured media content. The size or the time limit may be based on a default value, such as 5 minutes, or be user configurable. Once the threshold limit is reached, the system may disable the instant capture feature, or the system may continue capturing, synching, tagging, and/or storing of the media content but delete or overwrite the most outdated media content based on a time stamp.

Based on the instant capture feature or the triggering event, the system determines that there is a road trip event and begins processing the synched media content for storage, as described above in FIG. 2 (318).

Figure 4:
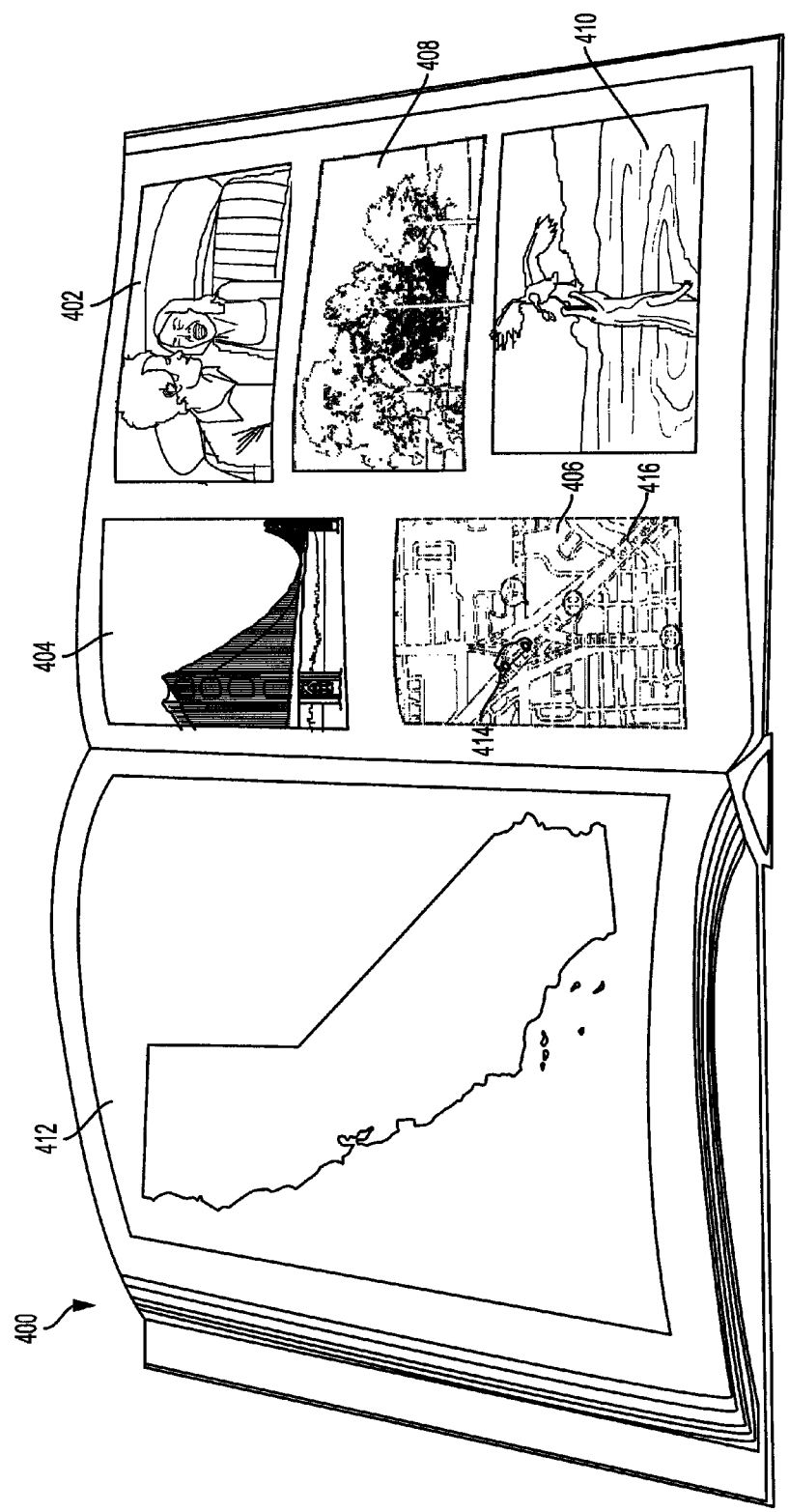
FIG. 4 is an illustration of an example road trip album according to an aspect of the invention.

FIG. 4 is an illustration of an example road trip album 400. One or more computers or one or more data processing apparatuses, for example, the ECU 112 of the multimedia capture system 100, appropriately programmed, may implement the road trip album 400.

The system may store information that generates the road trip album in a storage device, e.g., a network or cloud storage device. In some implementations, the system causes a user interface 128, e.g., a personal device connected to the vehicle 102, to generate the road trip album 400.

The road trip album 400 may be configured or shaped as a digital photo album. The digital photo album may have multiple pages. Each page of the road trip album may be associated with a different road trip event. An open page may have a left-hand portion and a right-hand portion. Each portion may include multiple video display frames, e.g., video display frames 402, 404, 406, 408, 410 and 412. The multiple video display frames may display one or more stored videos of a particular road trip event and/or an integrated road map. Each of the multiple video display frames may display a video of an interior of the vehicle 102 or a video of an outside view. In some implementations, the display of the videos is interchangeable among the video display frames, and the placement of the videos is based on user configurable settings.

In some implementations, the road trip album displays the integrated road map in a video display frame, e.g., video display frame 406. An integrated road map is a road map of the road trip that is associated with the particular road trip event. The integrated road map may include a location 414 that indicates the location of the vehicle 102 during a time period of when the particular road trip event occurred. The indication of the location of the vehicle 102 may progress along a route while the video of the particular road trip event is displayed. For example, a picture of a vehicle 102 may progress on the road trip from location 414 to location 416 as video displayed on the right-hand portion transitions from a start time, $t_0$, to an end time, $t_1$. The video may transition from that of the Golden Gate Bridge to Alcatraz Island, e.g., in video display frame 404, during the time period from $t_0$ to $t_1$. Location 414 corresponds to the location of vehicle 102 at time $t_0$ and location 416 may correspond to the location of the vehicle 102 at time $t_1$.

In some implementations, the one or more stored videos are displayed in the right-hand portion of the open page of the road trip album. The one or more stored videos displayed in the one or more video display frames include one or more interior videos and one or more exterior videos recorded at the start time of the particular road trip event.

Each of the video display frames may display an interior view or exterior view of the vehicle during the time period $t_0$ to $t_1$ of the particular road trip event. The time $t_0$ and $t_1$ may be based on the buffer settings. In each video display frame, e.g., video display frames 402, 404, 406, 408, 410 and 412, is a video originally captured by one of the multiple cameras 134 during a particular time period defined by the buffer settings and triggered by the triggering event. For example, the road trip album, in video display frame 402, displays a video of a couple laughing and watching the events unfold which triggered the particular road trip event. Simultaneously, the road trip album displays the videos of the exterior to the vehicle 102 that were synchronized to the particular road trip event in the other video display frames.

In video display frame 410, the road trip album displays a funny video captured by an exterior passenger side camera as the vehicle 102 approached a marshland near the San Francisco Bay, as shown by the location 414 of the vehicle 102 in video display frame 412. The laughter of the couple in video display frame 402 that triggered the particular road trip event may be in response to the crocodile snatching the bird in video display frame 410.

In video display frame 404, the road trip album displays a video of the Golden Gate Bridge captured by an exterior driver side camera and that is synchronized with the other videos. The view of the captured video of the Golden Gate Bridge is opposite of the captured crocodile scene. In video display frame 408, the road trip album displays another synchronized video of a different view. The video in video display frame 408 is that of passing trees as shown from another passenger side window.

The road trip album may include general information related to the particular road trip event. The road trip album may display the general information in the left-hand portion of the open page, e.g., the video display frame 412. The general information may be included in the generated road trip album or may be extracted from an external database through a network connection. The general information may include information about landmarks shown in one of the video display frames. For example, the road trip album may display information about California or about the particular road trip event in the video display frame 412 because the videos in the video display frames on the right-hand portion are related to a particular road trip event in California.

As the multiple synchronized videos play in the video display frames, the road trip album may play audio that is synchronized with the multiple videos. The audio may be sounds inside the vehicle, outside the vehicle, or both.

In some implementations, the road trip album displays the integrated road map in the left-hand portion and the one or more stored videos and/or integrated road map in the right-hand portion. The placement of the multiple videos may be user configurable or may be pre-determined prior to storage of the multiple videos.

Figure 5:
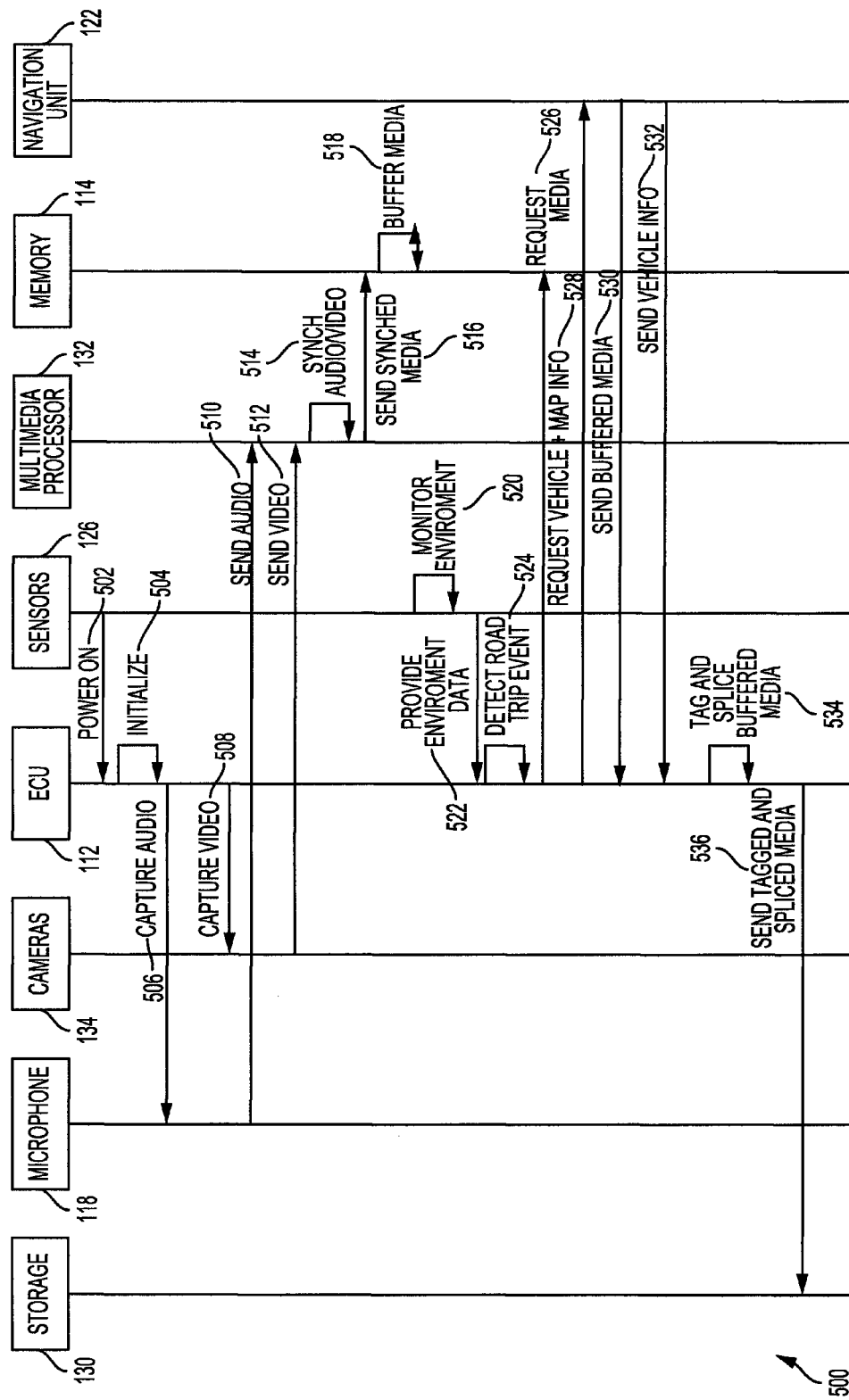
FIG. 5 is an example sequence of component interactions to implement the road trip album according to an aspect of the invention.

FIG. 5 shows an example sequence of component interactions to implement the road trip album. One or more computers or one or more data processing apparatuses, for example, the multimedia capture system 100, appropriately programmed, may perform the sequence 500.

One or more sensors 126, e.g., an ignition sensor, may send a vehicle power on indication to the ECU 112 (502). In some implementations, the navigation unit 122 may send an indication that the navigation unit was powered on to the ECU 112. The ECU 112 may initialize the multimedia capture mode based on the indication (504). The ECU 112 requests the one or more microphones 118 to capture audio (506) and the multiple cameras 134 to capture video (508). The one or more microphones 118 may send the captured audio to a multimedia processor 132 (510). The multiple cameras 134 may send the captured video to the multimedia processor 132 (512). In some implementations, there is no captured audio. The multimedia processor 132 synchronizes the captured media content (514). The captured media content may include captured video and/or audio based on user configurable settings. The multimedia processor sends the synched media to the memory 114 (516), and the memory 114 buffers the media based on user configurable settings that establish the storage size allocated for buffering media content (518).

The one or more sensors 126, e.g., a facial recognition sensor or an audio sensor, monitor the environment (520). The sensors 126 may monitor the environment periodically, continuously, and/or in real-time. The sensors 126 may take measurements of the environment including frequency measurements to determine audio expressions or facial measurements to determine facial expressions based on user configurable settings. The sensors 126 may provide the environmental data including the measurements to the ECU 112 (522). The ECU 112 may then detect a triggering event by comparing the measurements of the environment to a baseline (524). The baseline may be pre-programmed or configured by a user. The comparison may be based on the identities of the occupants. For example, a frequency of over 1 kHz may indicate laughter from a male occupant while a frequency of over 2 kHz may indicate laughter from a female occupant. In another example, the one or more sensors 126 may identify Jane as an occupant of the vehicle based on her facial features or voice, and use a stored profile that includes Jane's baseline facial features to determine if Jane is laughing at any time during the road trip.

If the ECU 112 detects a triggering event, the ECU 112 may request the buffered media from the memory 114 (526) and vehicle information and map information from the navigation unit 122 (528). The vehicle information may include a current location of the vehicle 102, a current elevation of the vehicle 102, and date/time information. The ECU 112 may request information on the identity of the occupants from the one or more sensors 126. The map information may include landmark information of nearby landmarks. The memory 114 may send the buffered media to the ECU 112 (530). The navigation unit may send the vehicle information and the map information to the ECU 112 (532).

The ECU 112 may parse or splice the buffered media based on the user configurable settings that indicate the start and end time of a road trip event, and the ECU 112 may tag the buffered media content with date/time information, location information, and other information, which may include the identity of the occupants (534). The ECU 112 sends the tagged and parsed or spliced media content to one or more storage devices 130 (536) or display, e.g., on a personal device connected to the vehicle 102 or a vehicle entertainment center.

Although the vehicle described herein is operated by a driver, the systems and methods described herein may be equally applicable to autonomous and semi-autonomous vehicles.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A multimedia capture system for a vehicle, comprising:
   a plurality of cameras including a first camera and a second camera for capturing video;
   a memory for buffering the video;
   a video processor coupled to the plurality of cameras and the memory, the video processor configured to:
      capture, using the first camera, a first video of an interior view of the vehicle for a period of time,
      capture, using the second camera, a second video of an exterior view of surroundings of the vehicle for the period of time, and
      synchronize the first video and the second video;
   a microphone for capturing audio within the vehicle;
   an audio processor for processing the captured audio; and
   an electronic control unit including a multimedia processor that is configured to:
      buffer, in the memory, the synchronized video,
      detect a triggering event identified from the captured first video of the interior view of the vehicle or the captured audio within the vehicle, and
      store, in a storage device, the synchronized video in response to the triggering event.

2. The multimedia capture system of claim 1,
   wherein the captured audio includes one or more audio expressions;
   wherein the audio processor is configured to measure a frequency level of the one or more audio expressions.

3. The multimedia capture system of claim 2, wherein to detect the triggering event, the multimedia processor is configured to:
   determine that the triggering event occurred if the frequency level of the one or more audio expressions is within a particular range, wherein the particular range is user configurable or pre-determined.

4. The multimedia capture system of claim 3, wherein the multimedia processor is configured to synchronize the audio with the synchronized video.

5. The multimedia capture system of claim 1, wherein the multimedia processor is further configured to store the synchronized video beginning at a start time and ending at a finish time, the start time being at the time of the triggering event and the finish time being a threshold amount of time after the triggering event.

6. The multimedia capture system of claim 5, wherein at least one of the start time, the finish time, or the threshold amount of time after the triggering event is a user configurable setting.

7. The multimedia capture system of claim 1, wherein the triggering event is a selection of a user interface element on a user interface.

8. The multimedia capture system of claim 1, further comprising:
   a navigation unit coupled to the electronic control unit for obtaining vehicle information including a current date and time and a current location of the vehicle;
   wherein the multimedia processor is further configured to:
      obtain, from the navigation unit, the vehicle information;
      identify one or more landmarks being captured in the second video based on the vehicle information; and
      tag the one or more landmarks in the synchronized video.

9. The multimedia capture system of claim 1, further comprising:
   one or more external databases connected to the vehicle through a network, wherein the one or more external databases includes landmark information,
   wherein the multimedia processor is further configured to:
      obtain, from the one or more external databases, the landmark information;
      identify one or more landmarks being captured in the second video based on the landmark information; and
      tag the one or more landmarks in the synchronized video.

10. The multimedia capture system of claim 1, wherein to store the synchronized video, the multimedia processor is further configured to:
   access one or more storage devices connected to the vehicle through a network; and transmit the synchronized video to the one or more storage devices connected to the vehicle through the network.

11. A computer-implemented method for a road trip album for a vehicle, the method comprising:
    capturing, in one or more video processors and using a first camera, a first video of an interior view of the vehicle for a period of time;
    capturing, in the one or more video processors and using a second camera, a second video of an exterior view of a surrounding of the vehicle for the period of time;
    synchronizing, using the one or more video processors, the first video and the second video;
    buffering, in a memory, the synchronized video;
    obtaining, using an audio processor and a microphone, audio within the vehicle;
    detecting a triggering event identified from the captured first video of the interior view of the vehicle or the captured audio within the vehicle; and
    storing the synchronized video in response to the triggering event.

12. The computer-implemented method of claim 11, further comprising:
    obtaining vehicle information including a current date, location, and elevation of the vehicle;
    identifying one or more landmarks being captured in the second video; and
    tagging the one or more landmarks in the synchronized video.

13. The computer-implemented method of claim 12, wherein storing the synchronized video includes the tagged one or more landmarks, the vehicle information and one or more identities of occupants of the vehicle.

14. The computer-implemented method of claim 11, wherein the triggering event is user input that activates storing of the synchronized video.

15. The computer-implemented method of claim 11, wherein detecting the triggering event comprises:
    determining, from the captured audio, an audio expression for an occupant of the vehicle; and
    determining that the audio expression has a frequency that is within a particular range.

16. The computer-implemented method of claim 11, further comprising:
    synchronizing, in a multimedia processor, the captured audio and the synchronized video; and
    storing the captured audio with the synchronized video.

17. The computer-implemented method of claim 11, further comprising:
    obtaining, from a user interface, user input, wherein the user input is configuration settings for the triggering event.

18. The computer-implemented method of claim 17, wherein detecting the triggering event comprises:
    capturing, using the first camera, one or more facial features of an occupant;
    determining one or more facial expressions of the occupant of the vehicle based on the one or more facial features; and
    determining that the triggering event occurred based on the one or more determined facial expressions and the configuration settings for the triggering event.

19. A multimedia capture system for an autonomous vehicle, comprising:
    a plurality of cameras including a first camera and a second camera for capturing video;
    a memory for buffering the captured video;
    a video processor coupled to the memory and the plurality of cameras, the video processor configured to:
        capture a first video of an interior view of the autonomous vehicle for a period of time,
        capture a second video of an exterior view surroundings of the vehicle for the period of time, and
        synchronize the first video and the second video;
    a microphones for capturing audio within the autonomous vehicle;
    an audio processor for processing the captured audio; and
    an electronic control unit including a multimedia processor that is configured to:
        buffer, in the memory, the synchronized video;
        detect a triggering event identified from the captured first video of the interior view of the vehicle or the captured audio within the vehicle; and
        store the synchronized video in response to the triggering event.

20. The multimedia capture system of claim 19, wherein the autonomous vehicle operates using one or more sensors or a navigation unit and without human input.

* * * * *